Feb. 21, 1967 E. G. SUNDBERG 3,305,404
HERMETICALLY SEALED STORAGE BATTERY
Filed Oct. 22, 1964 2 Sheets-Sheet 1

INVENTOR
ERIK G. SUNDBERG
BY Strauch, Nolan & Neale
ATTORNEYS

Feb. 21, 1967

E. G. SUNDBERG 3,305,404

HERMETICALLY SEALED STORAGE BATTERY

Filed Oct. 22, 1964

INVENTOR

ERIK G. SUNDBERG

BY Strauch, Nolan & Neale

ATTORNEYS

United States Patent Office 3,305,404
Patented Feb. 21, 1967

3,305,404
HERMETICALLY SEALED STORAGE BATTERY
Erik Gustav Sundberg, Nol, Sweden, assignor to Aktiebolaget Tudor, Stockholm, Sweden, a corporation of Sweden
Filed Oct. 22, 1964, Ser. No. 405,697
5 Claims. (Cl. 136—160)

The present invention relates to electrolytic cells, particularly storage battery cells, containing at least one positive electrode and at least one negative electrode, a liquid electrolyte, and electrolyte-resistant, microporous electrolyte-permeable partitions arranged between the electrodes.

The invention is particularly significant with respect to cells in which during normal operation a certain value for the terminal voltage is never exceeded and as a result of this voltage limitation only oxygen is evolved.

The invention is important particularly for lead storage batteries, since these, as a result of their relatively favorable power-volume ratio, are used almost exclusively as an energy source for vehicles and boats; and frequently during such use none of the evolved gases can be permitted to escape from the storage battery cells. In such cells the cell voltage is limited to 2.4 volts, at which voltage the evolved gas is oxygen and only insignificant amounts of hydrogen are evolved.

It is known to prepare completely closed storage battery cells using an alkaline electrolyte; but such completely closed cells have not been previously functional with lead storage batteries using dilute sulfuric acid as the electrolyte. The basic problems with lead storage batteries are that great difficulties encountered in bringing the evolved oxygen into sufficiently intimate contact with the negative active material. If the evolved oxygen can be brought into contact with the negative active material, it will be reused in the battery operation. Where no such contact is made, the pressure of the oxygen builds up and stops the battery reaction from taking place.

In order to obviate this problem, several suggestions have been proposed, but as far as lead storage batteries with liquid electrolytes are concerned, no successful results with regard to hermetically sealed cells have been made prior to the present invention.

Accordingly, a principal object of this invention is to provide a pump arrangement in a hermetically sealed electrolytic cell, which pumps the oxygen evolved through conduits to the lower portion of the cell and particularly to the vicinity of the lower portions of the negative electrodes so that the oxygen can rise up along and in contact with the surfaces of the negative electrode.

Another object is to provide in such a cell, a means for removing any hydrogen from an oxygen-hydrogen gas mixture evolved during the operation of a lead storage battery and for circulating the oxygen past the negative plates of the battery.

A further object is to provide a novel process for circulating gases evolved during the operation of a lead storage battery so that the gases contact the surface of the negative plates of the battery.

These and other objects will become more fully apparent from the claims, and the description as it proceeds in connection with the drawings wherein:

Figure 1:
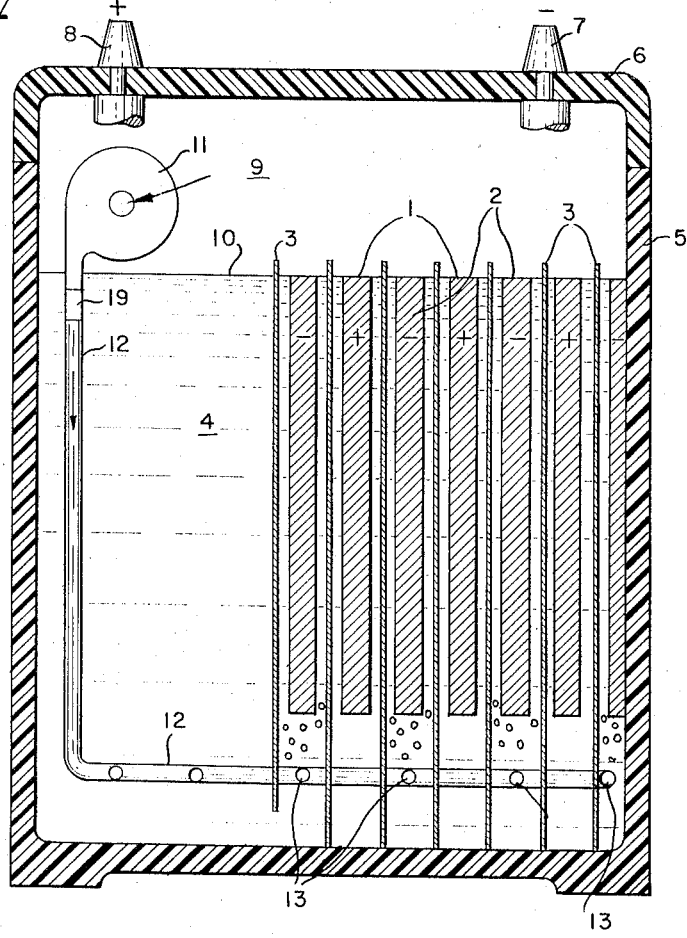
FIGURE 1 is a side elevation in section of the hermetically sealed electrolytic cell of this invention.

Referring now to the drawings, wherein FIGURE 1 shows the positive electrodes 1 and negative electrodes 2 with partitions 3 arranged between them together with liquid electrolyte 4 in a vessel 5 which is covered by a lid 6 and hermetically sealed. Outside conections 7, 8 are arranged in known manner in the form of pole screws or pole taps which are gas-tightly inserted through the vessel wall or lid. Electrical connections between the electrodes of the same polarity may be of any conventional arrangement and have not been illustrated. The electrodes, as shown, advantageously do not extend down to the bottom of the vessel but stop some distance above so that a certain electrolyte space is found below the electrodes. On the other hand the partitions 3 are advantageously arranged so that they extend to the vessel bottom, or at least further down than the electrodes for a reason that will become apparent. Above the surface 10 of the electrolyte 4 a space 9 is sufficiently large to permit the arrangement of a pump 11 for transporting the gas which collects in space 9 through channel 12 to a dispersing tube 13, which in the illustrated example, is arranged below the negative electrodes. A filter 19 may be inserted in the gas path of circulation as in channel 12 as shown in FIGURE 1.

In some instances, secondary reactions occur during the operation of the cell, even though the terminal voltage of the cell may not exceed 2.4 volts. These secondary reactions produce small amounts of hydrogen which interfere with the reaction of the oxygen and the negative electrodes and are not themselves consumed in this reaction.

Filter 19 is preferably a porous substance such as gas permeable membranes of platinum and/or palladium, or alloys of these metals, and acts as a catalyst for flameless combustion of a portion of the oxygen-hydrogen mixture to remove the hydrogen therefrom.

Pump 11 may be any suitable type pump such as a centrifugal pump, a membrane pump or a bellows pump. If a bellows or membrane pump is used, it is advantageously powered by means of an electrical magnetic vibrator, a pull magnet or other conventional apparatus. In the illustrated embodiment of FIGURE 1, the pump and a driving arrangement (not shown) are both enclosed in the hermetically sealed casing of the storage battery cell. The driving arrangement is normally electrical and may be connected to the poles of the cell or to two or more of the electrodes to eliminate the need for an external power source.

Figure 2:
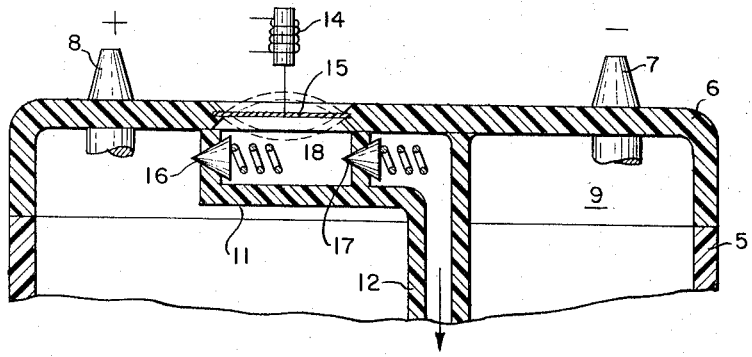
FIGURE 2 is a view of the upper portion only of a cell as in FIGURE 1, showing one form of the gas pumping means.

In another embodiment of the invention, which is illustrated in FIGURE 2, pump 11 is arranged within the cell and driving arrangement 14 on the outside of it. By arranging the pump membrane 15 in lid 6 the tightening problem is solved by connection between driving arrangement 14 and the pump itself in a simple and safely operating manner. Suction valve 16 and pressure valve 17 are ordinarily components of this type of pump and are biased to closed position by a biasing means such as coil springs 18.

Figure 3:
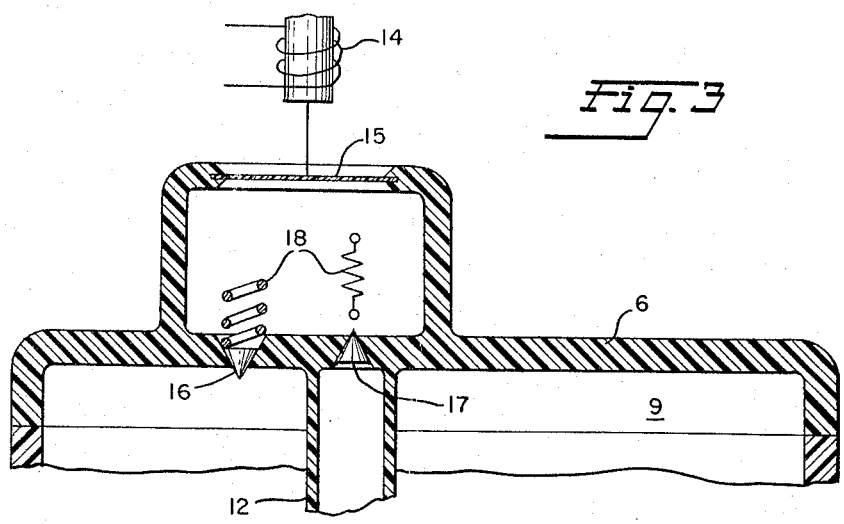
FIGURE 3 is a view similar to FIGURE 2, showing another form of the gas pumping means.

According to FIGURE 3, pump 11 as well as driving arrangement 14 may be located outside the storage battery cell in whose lid or vessel wall are arranged suction and pressure valves 16 and 17, respectively.

Figure 4:
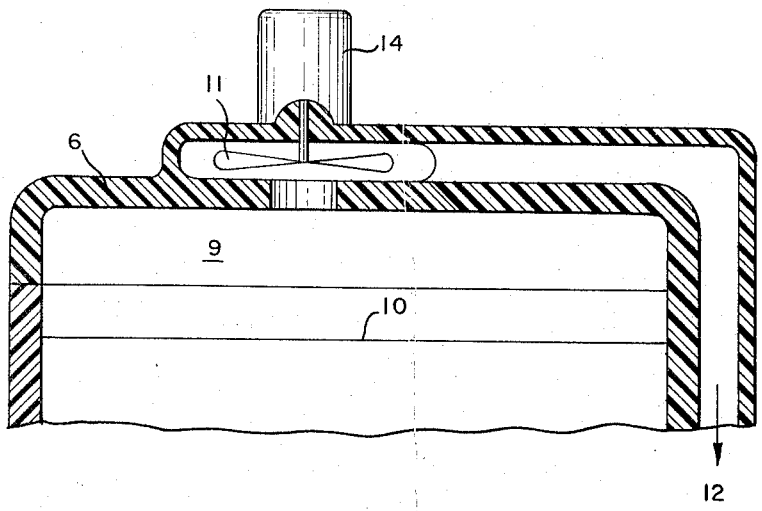
FIGURE 4 is a view of another wall portion of the cell of FIGURE 1 with another form of the gas pumping means.

In FIGURE 4 both pump 11, shown as a centrifugal pump and driving arrangement 14 are arranged outside the cell itself. They may be firmly built together with the cell vessel lid 6 or a vessel wall.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A storage battery comprising a hermetically sealed casing, a liquid electrolyte and negative and positive plates arranged to provide a space free of liquid above said plates and a space filled with liquid at the bottom portions of said plates; a conduit extending from the liquid free space to said space at the bottom portions of said plates; said conduit having openings at the bottom portions of said negative plates; and means for pumping gas from said liquid free space through said conduit to thereby direct the pumped gas along the bottom portion of said negative plates to be in contact with the surface of the negative plates as said gas rises to said liquid free space.

2. The battery of claim 1 wherein said means for pumping gas is completely enclosed within said hermetically sealed casing and is driven by the power from said battery.

3. The battery of claim 1 wherein said means for pumping gas comprises a membrane pump having its membrane arranged in a wall of said hermetically sealed casing.

4. The battery of claim 1 wherein said means for pumping gas comprises a membrane pump having its valves arranged in a wall of said hermetically sealed casing.

5. The battery of claim 1 including a filter means within the path of circulation of said gas for elimination of hydrogen contained therein.

References Cited by the Examiner

UNITED STATES PATENTS

| | | | |
|---|---|---|---|
| 632,873 | 9/1899 | De Lavison | 136—86.2 |
| 1,572,403 | 2/1926 | Mershon. | |
| 3,083,253 | 3/1963 | Sundberg | 136—160 |

WINSTON A. DOUGLAS, *Primary Examiner.*

D. L. WALTON, *Assistant Examiner.*